United States Patent [19]
Murray

[11] 3,894,599
[45] July 15, 1975

[54] ELECTRICAL AUXILIARY POWERED BICYCLE

[76] Inventor: Vincent A. Murray, 353 3rd St., Clifton, N.J. 07011

[22] Filed: June 21, 1974

[21] Appl. No.: 481,630

[52] U.S. Cl. ............... 180/33 C; 180/34; 46/243 S
[51] Int. Cl. ............................................. B62m 7/00
[58] Field of Search ................ 180/34, 33 C, 65 R; 280/215, 261; 310/23, 24, 66; 46/243 S

[56] References Cited
UNITED STATES PATENTS

| | | | |
|---|---|---|---|
| 491,040 | 1/1893 | Cummins | 180/33 C |
| 596,272 | 12/1897 | Libbey | 310/66 |
| 2,570,766 | 10/1951 | Chenault | 46/243 S |
| 3,533,484 | 10/1970 | Wood | 180/34 X |
| 3,598,195 | 8/1971 | Steller | 180/34 X |
| 3,676,719 | 7/1972 | Pecci | 310/24 |

Primary Examiner—Kenneth H. Betts
Attorney, Agent, or Firm—Howard I. Podell

[57] ABSTRACT

A bicycle powered by electrical solenoids, one of which is linked by cable to each foot pedal of the conventional chain drive. Manually operated switches mounted on the bicycle handles control the operation of the solenoids. The solenoids are powered by a battery which may be charged by an alternator-generator when the bicycle is coasting or going down hill. The bicycle may be propelled by normal foot action on the pedals with the solenoids supplying additional power, as required.

2 Claims, 2 Drawing Figures

ELECTRICAL AUXILIARY POWERED BICYCLE

SUMMARY OF THE INVENTION

My invention relates to a bicycle which is powered by electrical solenoids, each attached by a tension cable to a conventional foot pedal of the bicycle chain drive.

The solenoids are controlled by manual switches located on the bicycle handles and powered by a battery which may be charged by an alternator-generator, when the bicycle is going down hill or manually powered.

BRIEF DESCRIPTION OF THE DRAWING

The objects and features of the invention may be understood with reference to the following detailed description of an illustrative embodiment of the invention, taken together with the accompanying drawings in which.

DESCRIPTION OF THE PREFERRED EMBODIMENT

Figure 1:
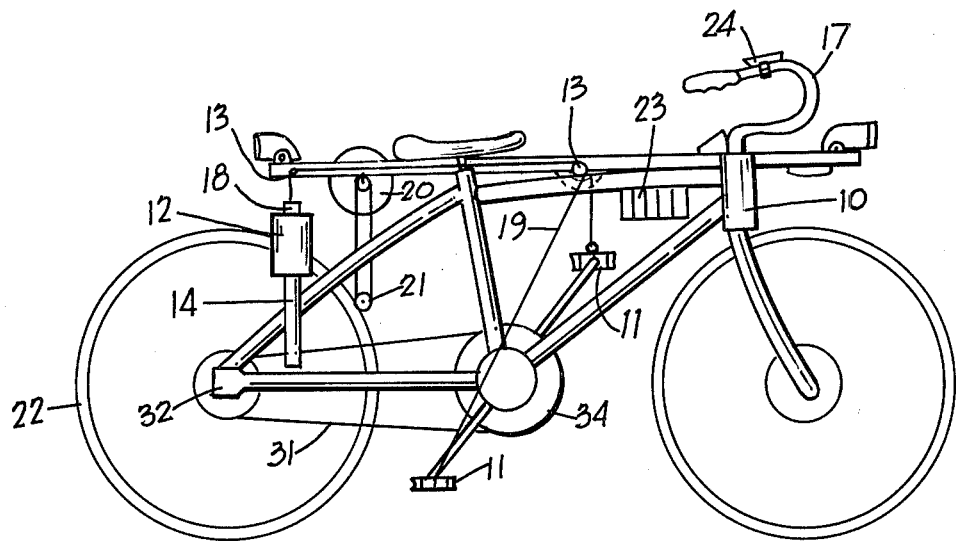
FIG. 1 illustrates an elevation view of the invention.
Figure 2:
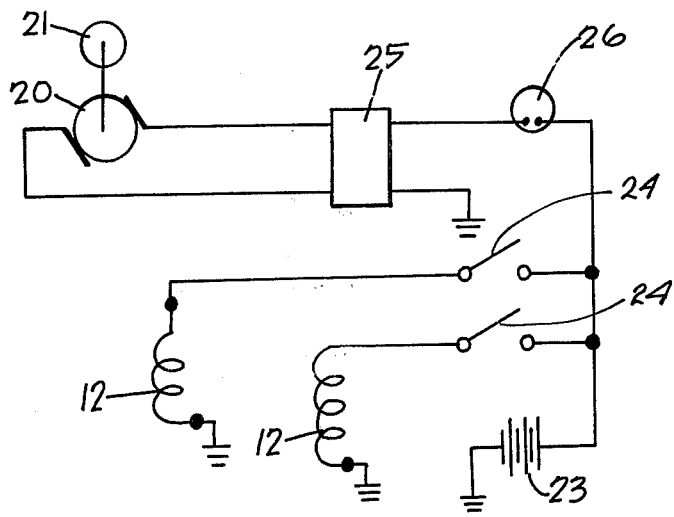
FIG. 2 illustrates a schematic diagram of the electric circuit of the invention.

Turning now descriptively to the drawings, in which similar reference characters denote similar elements throughout the several views, FIG. 1 illustrates the power equipped bicycle 10 which is fitted with a conventional chain drive 31 for driving the rear sprocket 32 of the rear wheel 22 from the pedal sprocket 34 rotated by foot pedals 11.

A conventional alternator-generator 20 driven off the rear wheel by a generator drive pulley 21 is connected to charge a battery 23, when the alternator-generator is in the operating mode.

Each pedal 11 is linked by a flexible tension cable 19 looped over pulleys 13 to an individual armature 18 of a solenoid 12 mounted on the rear frame 14 of the bicycle, with each solenoid electrically connected by a manual switch 24 located on the handle 17 of the bicycle to the battery 23.

Operation of an electrical switch 24 energizes the attached solenoid 12 to pull a tension cable 19 and revolve a pedal 11 to propel the bicycle 10.

The bicycle 10 may be operated by feet as customary, when the switches 24 are in the OFF position and the solenoids may be employed to assist foot action or to propel the bicycle independently of any foot action.

An ammeter 26 may be located in series with the battery 23 and the battery regulator control 25 to indicate charging or discharging of battery current.

Each solenoid 12 may be in the form of a linear drive motor.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A bicycle which may be electrically propelled or operated in conventional fashion comprising a bicycle equipped with a foot pedal drive mechanism together with an electrical solenoid powered system, said solenoid powered system incorporating a solenoid fixed to the bicycle frame, the armature of which is attached by tension means to a foot pedal, said solenoid being electrically connected by a manually operated switch to a battery, such that closing of said switch energizes the solenoid to exert propulsion force on said foot pedal.

2. The combination as recited in claim 1 in which two solenoids are employed, with the armature of each solenoid linked by tension means to a separate foot pedal.

* * * * *